United States Patent
Witczak et al.

(10) Patent No.: US 12,073,962 B2
(45) Date of Patent: Aug. 27, 2024

(54) METHOD OF FORMING A TRANSPARENT CONDUCTIVE MEMBER, AND A FREE-STANDING TRANSPARENT CONDUCTIVE FILM

(71) Applicant: XTPL S.A., Wrocław (PL)

(72) Inventors: Łukasz Witczak, Łódź (PL); Maciej Chrzanowski, Wrocław (PL); Artur Podhorodecki, Wrocław (PL); Filip Granek, Mrozów (PL)

(73) Assignee: XTPL S.A., Wroclaw (PL)

(*) Notice: Subject to any disclaimer, the term of this patent is extended or adjusted under 35 U.S.C. 154(b) by 0 days.

(21) Appl. No.: 18/045,014

(22) Filed: Oct. 7, 2022

(65) Prior Publication Data

US 2023/0125845 A1    Apr. 27, 2023

Related U.S. Application Data

(60) Provisional application No. 63/262,214, filed on Oct. 7, 2021.

(51) Int. Cl.
*H01B 5/14* (2006.01)
*B32B 7/12* (2006.01)
(Continued)

(52) U.S. Cl.
CPC .......... *H01B 5/14* (2013.01); *B32B 7/12* (2013.01); *B32B 17/10* (2013.01); *B32B 27/08* (2013.01);
(Continued)

(58) Field of Classification Search
CPC .......... B32B 17/10; B32B 2255/10; B32B 2255/205; B32B 2264/1051;
(Continued)

(56) References Cited

U.S. PATENT DOCUMENTS

2012/0145315 A1* 6/2012 Knaapila .......... H01B 1/22
264/440
2012/0314276 A1* 12/2012 Nomura .......... G02F 1/172
359/296
(Continued)

FOREIGN PATENT DOCUMENTS

EP    1477230 A1 * 11/2004    .......... B05B 5/0255

*Primary Examiner* — Philip C Tucker
*Assistant Examiner* — Jimmy R Smith, Jr.
(74) *Attorney, Agent, or Firm* — K&L Gates LLP

(57) ABSTRACT

Devices, systems, and methods related to a transparent conductive film are disclosed. In one aspect, a method of forming a transparent conductive member (e.g., a transparent conductive film) includes extruding a metallic nanoparticle composition from a capillary tube onto a temporary substrate to form an extrudate. The extrudate can include metallic nanoparticle lines. The method further includes sintering the extrudate and the temporary substrate, dispensing a photocurable polymer onto the temporary substrate, and laminating a second substrate to the photocurable polymer. The photocurable polymer and the extrudate are interposed between the temporary substrate and the second substrate. The method further includes curing the photocurable polymer to form a transparent polymer layer and separating the temporary substrate from the transparent layer to form the transparent conductive member. The transparent conductive member includes the transparent polymer layer and the extrudate embedded in the transparent polymer layer.

14 Claims, 9 Drawing Sheets

(51) Int. Cl.
*B32B 17/10* (2006.01)
*B32B 27/08* (2006.01)
*H01B 1/02* (2006.01)

(52) U.S. Cl.
CPC .............. *H01B 1/02* (2013.01); *B32B 2255/10* (2013.01); *B32B 2255/205* (2013.01); *B32B 2264/1051* (2020.08); *B32B 2307/202* (2013.01); *B32B 2307/412* (2013.01); *B32B 2307/732* (2013.01)

(58) Field of Classification Search
CPC ........ B32B 2307/202; B32B 2307/412; B32B 2307/732; B32B 27/08; B32B 7/12; H01B 1/02; H01B 1/22; H01B 5/14
See application file for complete search history.

(56) References Cited

U.S. PATENT DOCUMENTS

2013/0004753 A1* 1/2013 Majumdar .............. B32B 37/06
428/209
2017/0267899 A1* 9/2017 Brodd ................ H01B 13/0036

\* cited by examiner

METHOD OF FORMING A TRANSPARENT CONDUCTIVE MEMBER, AND A FREE-STANDING TRANSPARENT CONDUCTIVE FILM

CROSS-REFERENCE TO RELATED APPLICATION

This application claims the benefit of and priority under 35 U.S.C. § 119(e) to U.S. Provisional Application No. 63/262,214, titled METHOD OF FORMING A TRANSPARENT CONDUCTIVE MEMBER, AND A FREE-STANDING TRANSPARENT CONDUCTIVE FILM, filed Oct. 7, 2021, the disclosure of which is hereby incorporated by reference in its entirety.

BACKGROUND

A metallic nanoparticle composition can be printed on a substrate to form a conductive film. However, for some applications, it may be desirable for the conductive film to be transparent.

SUMMARY

In one aspect, a method of forming a transparent conductive member (e.g., a transparent conductive film) is disclosed. The method includes extruding a metallic nanoparticle composition from a capillary tube onto a temporary substrate to form an extrudate. The method further includes sintering the extrudate and the temporary substrate, dispensing a photocurable polymer onto the temporary substrate, and laminating a second substrate to the photocurable polymer. The photocurable polymer and the extrudate are interposed between the temporary substrate and the second substrate. The method further includes curing the photocurable polymer to form a transparent polymer layer and separating the temporary substrate from the transparent layer to form the transparent conductive member. The transparent conductive member includes the transparent polymer layer and the extrudate embedded in the transparent polymer layer.

In one aspect, a free-standing transparent conductive film is disclosed. The free-standing transparent conductive film includes a transparent polymer layer and metallic nanoparticle lines embedded in the transparent polymer layer. The metallic nanoparticle lines have line widths in a range of 1 µm to 10 µm. The metallic nanoparticle lines are separated by a pitch in a range of 50 µm to 1000 µm in at least one direction. The transparent conductive film comprises an optical transmission of at least 80% at 550 nm.

The above summary is not intended to describe each embodiment or every implementation of the present disclosure. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION

In various examples, the present disclosure relates to a free-standing transparent conductive film and a method of forming a transparent conductive member.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. As appropriate, any combination of two or more steps may be conducted simultaneously.

Figure 1:
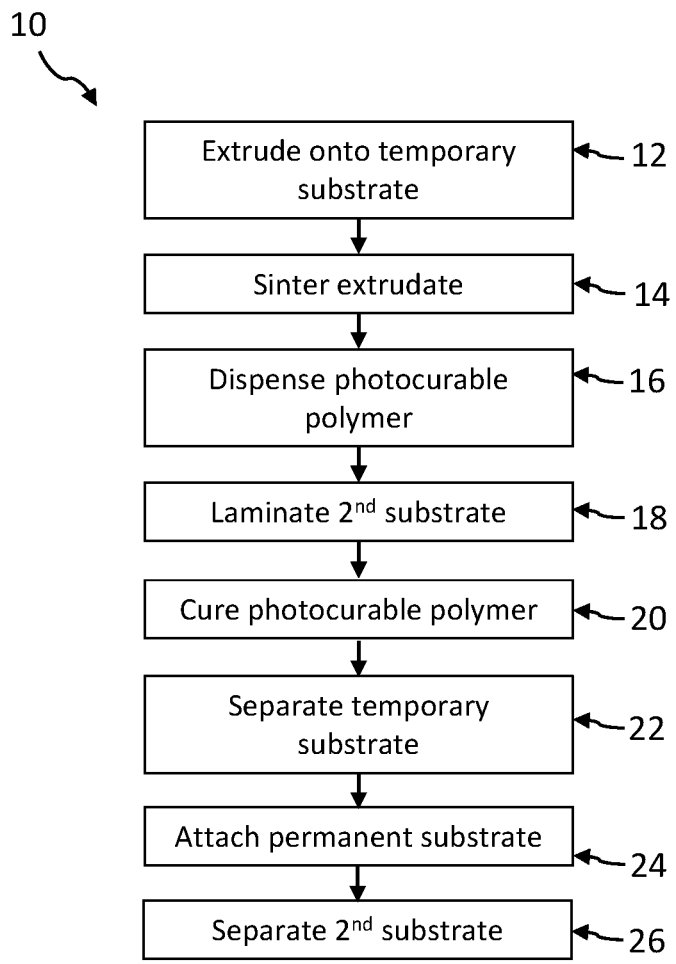
FIG. 1 is a flow diagram of a method of forming a transparent conductive member, according to at least one aspect of the present disclosure.

FIG. 1 is a flow diagram of a method 10 of forming a transparent conductive member. According to the method 10, a metallic nanoparticle composition is extruded 12 onto a temporary substrate. For example, a printing apparatus, such as the printing apparatus 100 of FIG. 2, can be used to carry out the extrusion (FIG. 1, step 12).

Figure 2:
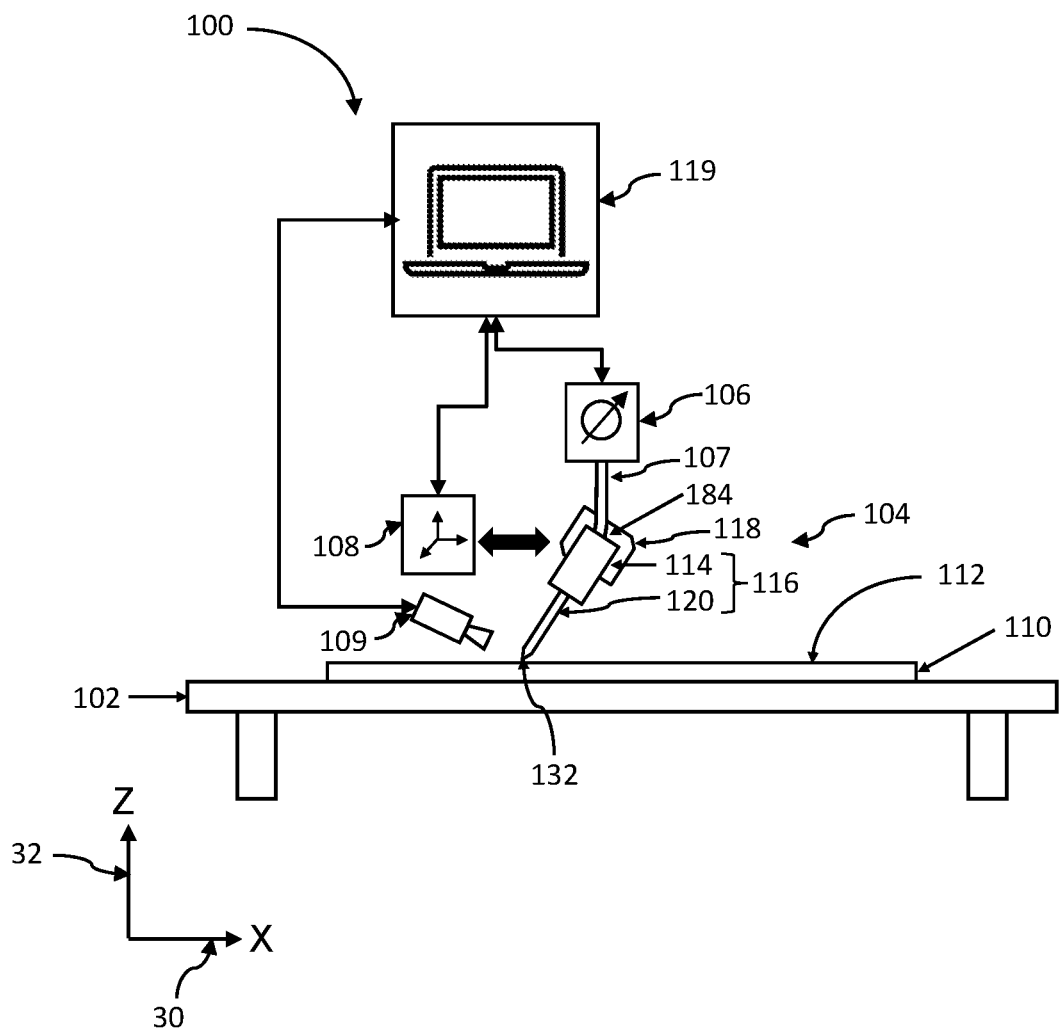
FIG. 2 is a block diagram of an illustrative printing apparatus, according to at least one aspect of the present disclosure.

FIG. 2 is a block diagram view of an example printing apparatus 100. The printing apparatus 100 includes a substrate stage 102, a print head 104, a regulated pneumatic system 106, a print head positioning system 108, and a controller 119. The printing apparatus 100 can also include an imaging system 109. The substrate stage 102 supports a substrate 110. The substrate 110 can be the temporary substrate, such as the temporary substrate onto which the metallic nanoparticle composition is extruded (FIG. 1, step 12) according to the method 10. Thus, the substrate 110 is sometimes referred to herein as the temporary substrate 110. The substrate 110 can be fixed in position on the substrate stage 102 during the printing (extruding or dispensing) and has a printable surface 112, which is facing upward and facing towards the print head 104. The print head 104 is positioned above the substrate 110. The print head 104 includes a dispenser 116 and a cartridge holder (e.g., dispenser holder 118). The dispenser 116 includes a piston-cylinder assembly 114 and a capillary tube 120, as described with reference to FIG. 5. Typically, the regulated pneumatic system 106 includes a pump and a pressure regulator. Referring to FIG. 2, a pneumatic port 184 of the piston-cylinder assembly 114 is coupled to the regulated pneumatic system 106 via tubing 107. In some aspects, the regulated pneumatic system 106 is capable of applying pressure in a range of 0 to 9 bar to the pneumatic port 184.

Figure 4:
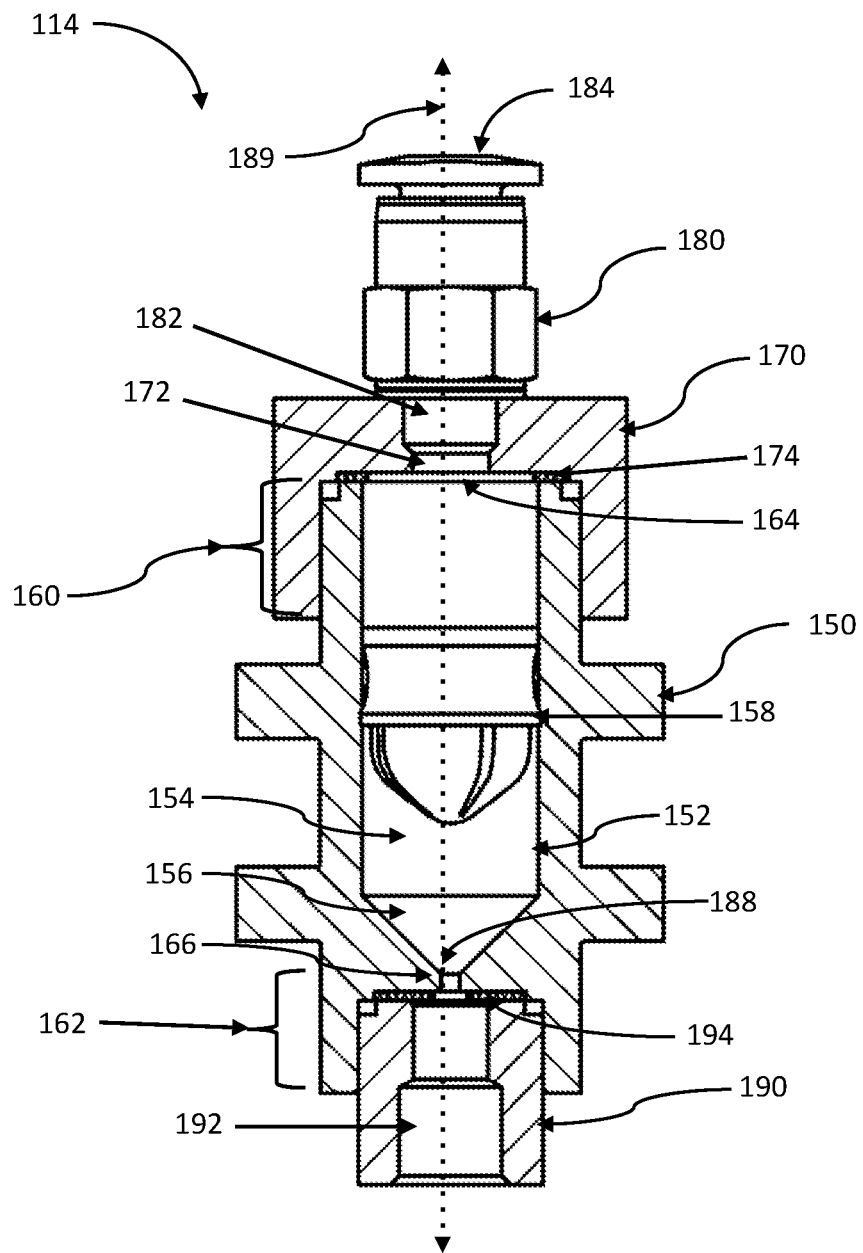
FIG. 4 is a schematic side view and partial cross-sectional view of a piston-cylinder assembly, according to at least one aspect of the present disclosure.

FIG. 4 is a schematic side view and partial cross-sectional view of an example piston-cylinder assembly 114. In the example shown, the piston-cylinder assembly 114 includes a cylinder 150, a cylinder cover 170, a pneumatic connector 180, and an intermediate sealing sleeve 190. The cylinder 150 is shown in cross-section to show a cylindrical cavity portion 154 and a conical cavity portion 156. A piston 158 is located inside cylinder 150. The piston 158 contacts an inner surface 152 of cylinder 150. The cylinder 150 has a first end (e.g., top end) portion 160 and a second end (e.g., bottom end) portion 162 opposite the first end. The cylinder cover 170 is sealably mated to the cylinder 150 at the first end portion 160. In the example shown, an interior surface of the cylinder cover 170 and an exterior surface of the cylinder 150 at its first end portion 160 form a threaded joint. A flat gasket 174 is under compression between the cylinder cover 170 and the cylinder 150 and forms a seal. The intermediate sealing sleeve 190 is sealably mated to the cylinder 150 at the second end portion 162. In the example shown, an exterior surface of the intermediate sealing sleeve 190 and an interior surface of the cylinder 150 at its second end portion 162 form a threaded joint. A flat gasket 194 is under compression between the intermediate sealing sleeve 190 and the cylinder 150 and forms a seal.

The cylinder cover 170 has an opening 172, which retains the pneumatic connector 180. A pneumatic port 184 extends longitudinally through the pneumatic connector 180. The cylinder 150 has a first end 164, in the first end portion 160, and a second end 166, in the second end portion 162. Accordingly, the pneumatic port is at the first end of the cylinder. Air or fluid enters the cylinder from the pneumatic port 184. Inside the cylinder, air or fluid first travels through the cylindrical cavity portion 154 and then a conical cavity portion 156, which tapers to an outlet port 188 at its apex. The outlet port 188 is at the second end 166 opposite the first end 164. The piston 158 is movable in the cylinder 150 between the first end 164 and the second end 166. The piston 158 and the cylinder 150 are movable relative to each along a common longitudinal axis 189 between a first end and a second end of the cylinder.

Figure 5:
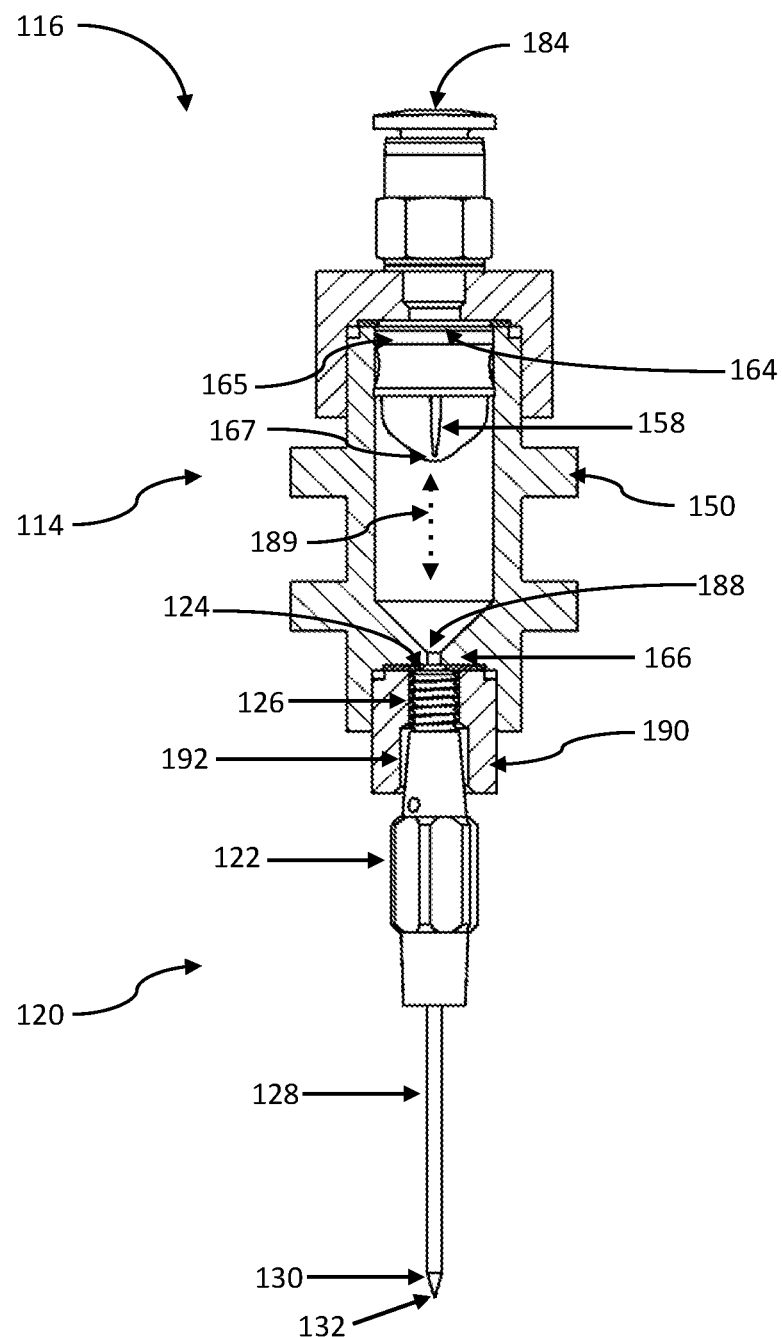
FIG. 5 is a schematic side view and partial cross-sectional view of a dispenser, according to at least one aspect of the present disclosure.

FIG. 5 is a schematic side view and partial cross-sectional view of an example dispenser 116. The dispenser 116 includes a piston-cylinder assembly 114 (FIG. 4) and a capillary tube (e.g., nozzle) 120. The capillary tube 120 has a tube inlet 124 and a tube outlet 132. The capillary tube 120 is described in greater detail with reference to FIG. 3. Referring to FIG. 5, there is a handle 122, including a threaded portion 126, attached to the capillary tube 120 of the dispenser 116. The threaded portion 126 and an interior surface 192 of the intermediate sealing sleeve 190 form a threaded joint. Accordingly, the intermediate sealing sleeve 190 retains the handle 122 that is attached to the capillary tube 120. The tube inlet 124 of capillary tube 120 is coupled to the outlet port 188 at the second end 166 of the cylinder 150. The capillary tube 120 is installed in the piston-cylinder assembly 114 to form the dispenser 116.

Figure 3:
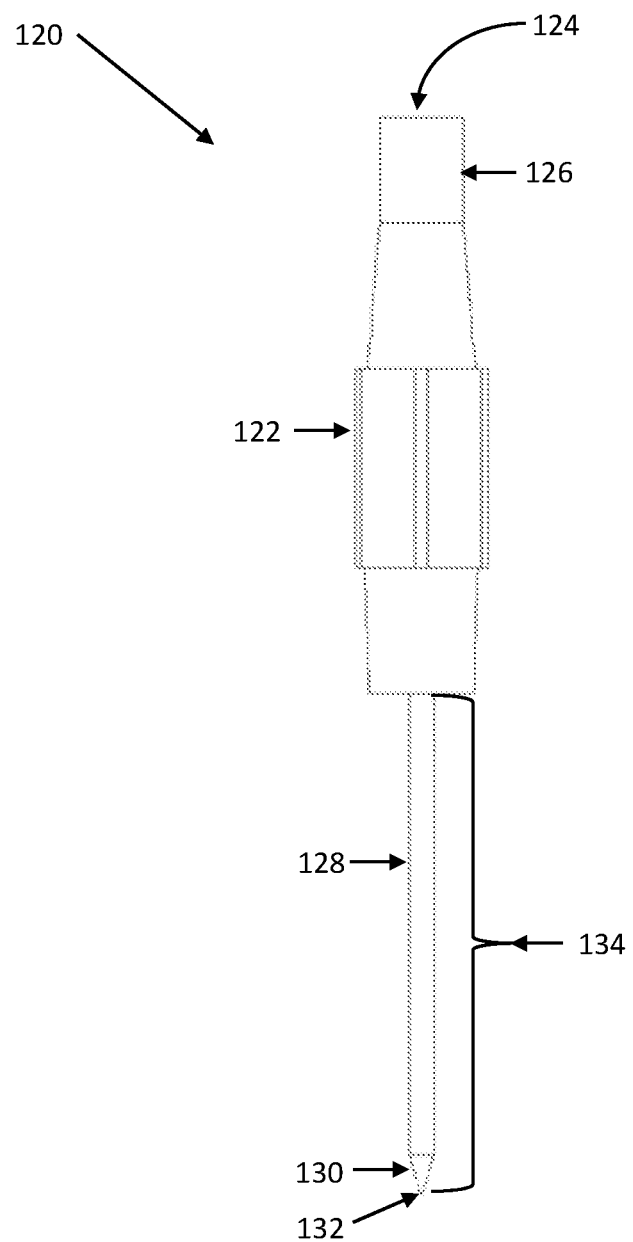
FIG. 3 is a schematic side view of a glass capillary tube, according to at least one aspect of the present disclosure.

Commercially available glass capillary tubes can be used in the dispenser 116. For example, glass capillary tubes (Eppendorf™ Femtotips™ II Microinjection Capillary Tips), having an inner diameter at the tip of 0.5 µm and an outer diameter at the tip of 0.7 µm, are available from Fisher Scientific. Referring to FIG. 3, the capillary tube 120 is schematically illustrated as a commercially available glass capillary tube. The capillary tube 120 has an inlet 124 at a first end, and outlet 132 at a second end opposite the first end, and an elongate fluid passageway between the inlet 124 and the outlet 132. A plastic handle 122 is attached to the capillary tube 120 around its circumference. The capillary tube 120 includes an inlet (e.g., an input end) 124 and a threaded portion 126 near the inlet 124 which can enable a threaded connection to an external body or external conduit (e.g., the threaded portion 126 and an interior surface 192 of the intermediate sealing sleeve 190 form a threaded joint to connect the capillary tube 120 to the piston-cylinder assembly 114, see FIG. 5). The inlet 124 can have an inner diameter of 1.2 mm.

The capillary tube 120 includes an elongate input portion 128 and a tapering portion 130. There is an externally visible portion 134 of the capillary tube 120. Some of the elongate input portion 128 may be obscured by the surrounding plastic handle 122. The tapering portion 130 tapers to an outlet (e.g., an output end) 132 (e.g., having an inner diameter of 0.5 µm and an outer diameter at the tip of 0.7 µm in the case of various Femtotips™ II Microinjection Capillary Tips). It is possible to increase the outlet 132 size by cutting the capillary tube 120 at a suitable longitudinal location along the tapering portion 130. Cutting may be done using a focused-ion beam (FIB) apparatus. Stainless-steel capillary tubes can also be used. In the examples described hereinbelow, the inner diameter of the capillary tube outlet was in a range of approximately 3.8 to 4.0 µm and the outer diameter of the capillary tube outlet was approximately 5.0 µm.

In preparing the printing apparatus 100 for use, a composition (e.g., a metallic nanoparticle composition, such as the metallic nanoparticle composition extruded 12 according to the method 10; FIG. 1, step 12) is injected into the cylinder 150. In the examples described hereinbelow, a metallic nanoparticle composition (silver nanoparticle composition) according to Example 1 was used. In the case of the piston-cylinder assembly 114 shown in FIG. 4, the metallic nanoparticle composition can be injected into the cylinder 150 via its first end 164 using a syringe, with the piston 158 removed from the cylinder 150 and the cylinder cover 170 and the pneumatic connector 180 detached from the cylinder 150. Subsequently, the piston 158 is positioned in the cylinder 150. In preparing the printing apparatus 100 for use, the cylinder cover 170 and the pneumatic connector 180 are attached to the cylinder 150 (e.g., as shown in FIG. 4). In preparing the printing apparatus 100 for use, the pneumatic port 184 is coupled to a regulated pneumatic system 106 via tubing 107, as illustrated in FIG. 2.

Figure 6:
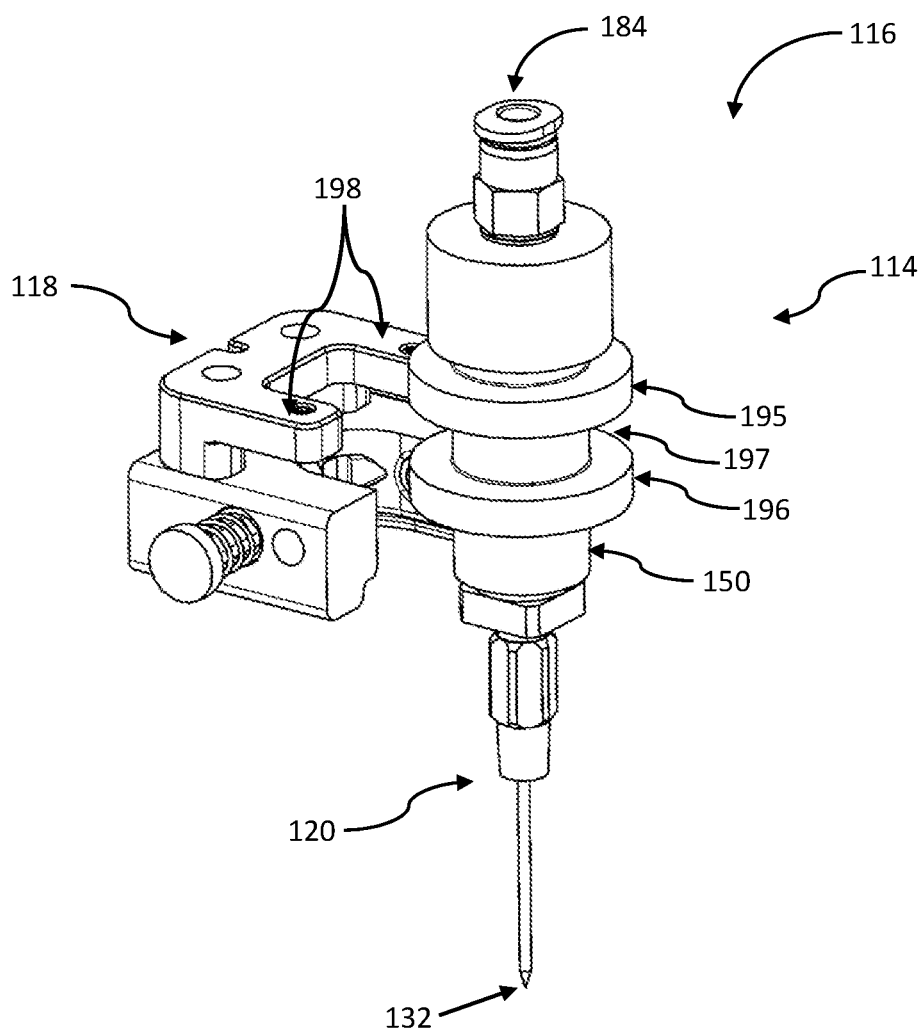
FIG. 6 is a schematic perspective view of a dispenser and an associated dispenser holder, according to at least one aspect of the present disclosure.

FIG. 6 is a schematic perspective view of a dispenser 116 and an associated dispenser holder 118. The dispenser holder 118 includes a fork 198. When assembled, the fork is inserted into a groove 197 between two annular protrusions 195, 196 that protrude radially outward from the outer walls of the cylinder 150. Accordingly, the dispenser holder 118 retains the dispenser 116. The dispenser holder 118 can be mechanically coupled to the print head positioning system 108 shown in FIG. 2. In preparing the printing apparatus 100 of FIG. 2 for use, the dispenser 116 is installed in the dispenser holder 118.

As shown in FIG. 2, the imaging system 109 captures images of the capillary tube outlet 132 and a portion of the printable surface 112 of the substrate 110 near the capillary tube outlet 132. The imaging system 109 is used to monitor a vertical distance (height) between the capillary tube outlet 132 and a surface on which a composition (e.g., the metallic nanoparticle composition extruded 12 according to the method 10; FIG. 1, step 12) is dispensed, such as the printable surface 112 of the substrate 110. The print head positioning system 108 is configured to vertically position and laterally position the print head 104 (e.g., the outlet 132 of the capillary tube 120) relative to the substrate 110. The print head positioning system 108 controls the vertical displacement of the print head 104 and the lateral displacement of the print head 104 relative to the substrate 110. In extruding (dispensing) a composition, regulated pressure is applied to a piston 158 in the piston-cylinder assembly 114. In some aspects, the extrusion of the composition (e.g., the dispensing of the composition) occurs based on the applied pressure and can be carried out without the application of electric fields to the composition.

The printing apparatus 100 can include a controller 119 (FIG. 2). For example, the controller 119 includes a computer with the hardware and software configured for communicating with and controlling the imaging system 109, the print head positioning system 108, and the pneumatic system 106. In some aspects, the controller 119 determines, using image data from the imaging system 109, a current vertical distance between the outlet 132 and the surface (the printable surface 112 of the substrate 110 on which the composition is being dispensed). In accordance with the current vertical distance, the controller 119 controls the print head positioning system 108 to maintain a vertical distance within a desired range.

Referring again primarily to FIG. 1, as noted above, according to the method 10, a metallic nanoparticle composition is extruded 12 onto the printable surface 112 of the temporary substrate 110 while displacing the capillary tube 120 relative to the temporary substrate 110 along a predetermined trajectory to form an extrudate (FIG. 1, step 12). For example, the printing apparatus 100 can be used to carry out the extrusion.

Figure 7:
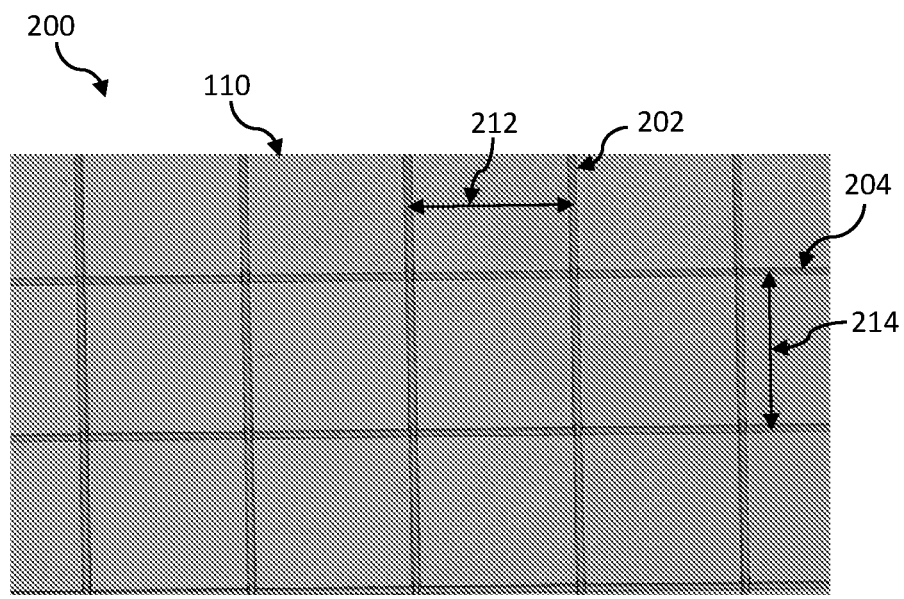
FIG. 7 is an optical microscope image of a silver nanoparticle mesh printed on a glass substrate, according to at least one aspect of the present disclosure.

The extrudate can include metallic nanoparticle lines. For example, FIG. 7 is an optical microscope view of a portion of an extrudate 200 printed on a temporary substrate 110, according to at least one aspect of the present disclosure. In the example shown, the temporary substrate 110 is a glass substrate. The extrudate 200 includes silver nanoparticle lines arranged in a mesh pattern. As shown in FIG. 7, the example extrudate 200 is illustrated with a mesh pattern formed with silver nanoparticle lines 202 (e.g., vertical lines with respect to FIG. 7) intersecting with and extending perpendicularly to silver nanoparticle lines 204 (e.g., horizontal lines with respect to FIG. 7). Adjacent silver nanoparticle lines 202 are separated by a pitch 212 and adjacent silver nanoparticle lines 204 are separated by a pitch 214. In the example shown in FIG. 7, the line width of the silver nanoparticle lines 202, 204 is approximately 5 μm, and the pitch 212, 214 is approximately 100 μm. In some aspects, the metallic nanoparticle lines of the extrudate have line widths in a range of 1 μm to 10 μm.

The line widths of the metallic nanoparticle line can be tuned by adjusting the capillary tube 120 outlet 132 size, the extrusion pressure, and the speed of lateral movement of the dispenser 116 relative to the substrate 110 (printing speed). To form the example extrudate 200 shown in FIG. 7, the printing speed was approximately 0.1 mm/sec. In some aspects, forming metallic nanoparticle lines to have line widths smaller (e.g., thinner) than 1 μm may result in the metallic nanoparticle lines having discontinuities. In some aspects, forming the metallic nanoparticle lines to have line widths greater (e.g., thicker) than 10 μm may result in the metallic nanoparticle lines blocking too much light from passing therethrough.

As schematically shown in FIG. 2, the capillary tube 120 is tilted relative to a Z-axis 32. To form the extrudate 200 shown in FIG. 7, the tilt angle was approximately 50°. When extruding the silver nanoparticle lines 202, the direction of tilt and the direction of lateral movement of the dispenser were parallel to each other. When extruding the silver nanoparticle lines 204, the direction of tilt and the direction of lateral movement of the dispenser were perpendicular to each other. The extrusion pressure used to form the silver nanoparticle lines 202 was 7 bar and the extrusion pressure used to form the silver nanoparticle lines 204 was 9 bar. A higher extrusion pressure was selected for the silver nanoparticle lines 204 than for the silver nanoparticle lines 202 to make the line widths of the silver nanoparticle lines 204 and the silver nanoparticle lines 204 approximately equal.

Referring again to FIG. 1, the workpiece, which includes the temporary substrate and the extrudate, is sintered (FIG. 1, step 14). In the example shown in FIG. 7, the workpiece (including the temporary substrate 110 and the extrudate 200) was sintered on a hot plate in air at 250° C. for 30 minutes.

Referring again to FIG. 1, a photocurable polymer is dispensed onto the temporary substrate 110 (e.g., onto the printable surface 112 of temporary substrate 110) and/or the extrudate (FIG. 1, step 16). In the example shown in FIG. 8, which is discussed more below, NOA63 (manufactured by Norland Products, Inc.), a clear, colorless, liquid photopolymer, was used as the photocurable polymer. To dispense 16 the NOA63 photocurable polymer, two drops of the NOA63 photocurable polymer were deposited on the temporary substrate and a silver nanoparticle mesh 222.

Referring again to FIG. 1, a second substrate is laminated 18 to the photocurable polymer such that the photocurable polymer and the extrudate are interposed between the temporary substrate 110 and the second substrate (FIG. 1, step 18). In some aspects, a flexible substrate, such as polyethylene terephthalate (PET), can be used as the second substrate. In the example shown in FIG. 8, which is discussed more below, a PET sheet was used as the second substrate. To laminate the PET sheet to the photocurable polymer, the PET sheet was pushed gently against the photocurable polymer and the silver nanoparticle mesh 222 until the photocurable polymer spread across the entirety of silver nanoparticle mesh 222. As a result the silver nanoparticle mesh 222 was embedded in the photocurable polymer layer.

Referring again to FIG. 1, the photocurable polymer is cured 20 to form a transparent polymer layer (FIG. 1, step 20). In some aspects, the transparent polymer layer is of sufficient thickness such that the extrudate (e.g., the silver nanoparticle mesh 222 of FIG. 8) is embedded in the transparent polymer layer. In the example shown in FIG. 8, the NOA63 photopolymer was cured using ultraviolet (UV) light for approximately 10 minutes to form a transparent polymer layer 224 (the cured NOA63) with the silver nanoparticle mesh 222 embedded in the transparent polymer layer 224. Upon curing, the NOA63 photopolymer crosslinks and bonds with the silver nanoparticle mesh.

Referring yet again to FIG. 1, the temporary substrate 110 is separated 22 from the transparent conductive layer (FIG. 1, step 22). In the example shown in FIG. 8, the temporary substrate was separated from the transparent conductive layer 224 using a knife.

Figure 8:
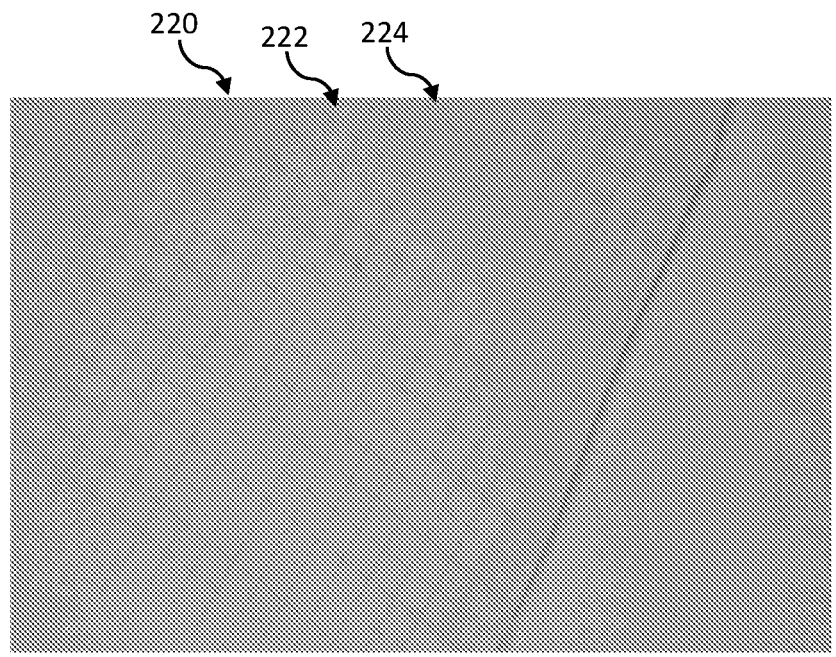
FIG. 8 is an optical microscope image of a silver nanoparticle mesh embedded in a transparent polymer layer, according to at least one aspect of the present disclosure.

FIG. 8 shows an optical microscope image of an example transparent conductive member 220 including a silver nanoparticle mesh 222 embedded in a transparent polymer layer 224. The pitch between adjacent lines in the silver nanoparticle mesh 222 is approximately 500 μm. FIG. 8 shows the transparent conductive member 220 after removal of the temporary substrate 110 (a glass substrate). Further, in FIG. 8, the second substrate (the PET film) is still attached to the transparent conductive member 220.

In various examples, a permanent substrate is optionally attached 24 to the transparent conductive member (e.g., attached 24 to the transparent conductive layer), wherein the permanent substrate is more elastic than the temporary substrate (FIG. 1, step 24). For example, the permanent substrate can be a plastic substrate. The permanent substrate can be attached to the side of the transparent conductive layer from which the temporary substrate has been removed.

In various examples, the second substrate is optionally separated 26 from the transparent conductive layer (FIG. 1, step 26). In the example shown in FIG. 8, the PET sheet could be easily removed from the transparent conductive layer 224. In aspects, where there are no substrates (e.g., no temporary substrate, no permanent substrate, no second substrate) attached to any side of the transparent conductive layer, the transparent conductive layer may be referred to as a free-standing transparent conductive film.

Various aspects of the transparent conductive member can be configured to achieve a desired optical transparency and/or a desired electrical resistance. For example, if the photocurable polymer in which the metallic nanoparticle lines are embedded is transparent when cured, the transparency of the transparent conductive member can be adjusted by controlling the line width and/or the pitch of the metallic nanoparticle lines, as discussed below with respect to FIG. 9. As another example, the electrical resistance of the transparent conductive member can be adjusted by controlling the resistivity of the metallic nanoparticles, the line width of the metallic nanoparticle lines, the line height of the metallic nanoparticle lines, the pitch of the metallic nanoparticle lines, and/or effectiveness of the sintering treatment (FIG. 1, step 14).

Figure 9:
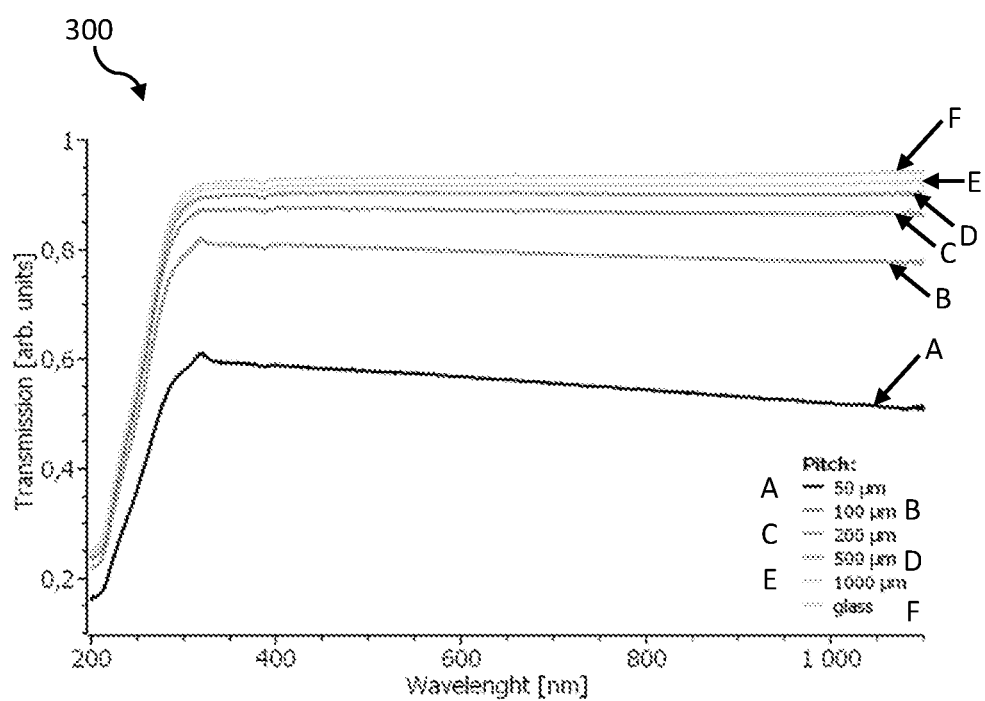
FIG. 9 is a graphical plot of the dependence of optical transmission on wavelength for illustrative transparent conductive members each having different line pitches, according to at least one aspect of the present disclosure.

FIG. 9 is a graph 300 depicting the optical transmission spectra of silver nanoparticle lines deposited and sintered on glass substrates. Specifically, the graph 300 depicts the optical transmission data for silver nanoparticle lines (line widths of approximately 5 μm) respectively separated by the following pitches: line A 50 μm, line B 100 μm, line C 200 μm, line D 500 μm, line E 1000 μm. For comparison, an optical transmission spectrum of a bare glass substrate is also shown in graph 300 as line F. As shown in FIG. 9, pitch has a large effect on the optical transmission where optical transmission decreases as pitch decreases. In some aspects, the optical transmission of the transparent conductive member can be at least 80% at 550 nm. In some aspects, the metallic nanoparticle lines can be spaced by a pitch in a range of 50 μm to 1000 μm in at least one direction.

Figure 10:
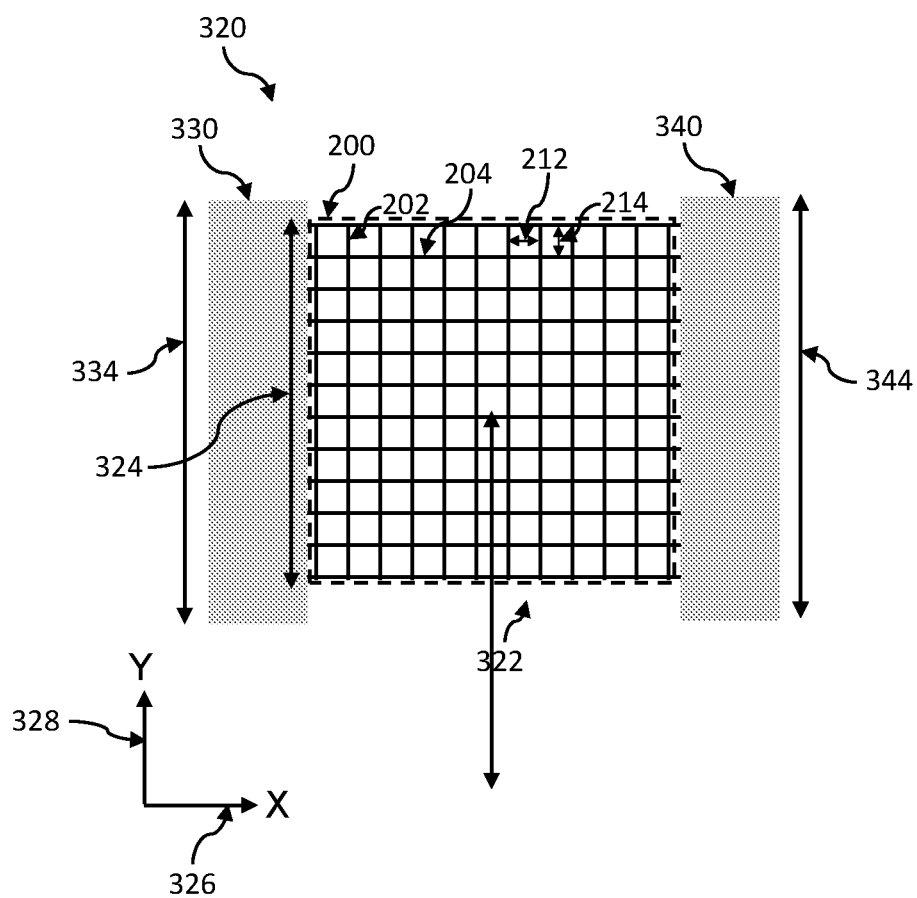
FIG. 10 is a schematic illustration of the sample setup for measuring the electrical resistance of a transparent conductive member, according to at least one aspect of the present disclosure.

FIG. 10 provides a schematic for an experimental setup for characterizing the electrical resistance of a metallic nanoparticle mesh sample 320 (e.g., metallic nanoparticle lines forming a metallic nanoparticle mesh), such as, for example the metallic nanoparticle mesh in a transparent conductive member. The metallic nanoparticle mesh sample 320 includes a metallic nanoparticle mesh. The metallic nanoparticle mesh 200 includes metallic nanoparticle lines 204 extending along the X-direction 326 and metallic nanoparticle lines 202 extending along the Y-direction 328, wherein the metallic nanoparticle lines 202 are approximately perpendicular to the metallic nanoparticle lines 204. Adjacent metallic nanoparticle lines 202 are separated by a pitch 212 and adjacent metallic nanoparticle lines 204 are separated by a pitch 214. In the example shown in FIG. 10, the pitches 212 and 214 are approximately equal. The metallic nanoparticle lines 202, 204 are arranged in a metallic nanoparticle mesh 200. The metallic nanoparticle mesh 200 has a first mesh dimension 322 ($L_1$) along the X-direction 326 and a second dimension 324 ($L_2$) along the Y-direction 328. In the example shown in FIG. 10, the metallic nanoparticle mesh 200 is approximately square ($L_1=L_2=L$) and the mesh dimensions are approximately 1 cm ($L_1=L_2=1$ cm).

Metallic contact pads 330, 340 are deposited on either side of the metallic nanoparticle mesh 200. The first mesh dimension 322 ($L_1$) also corresponds to a gap between the contact pads 330, 340. The contact pads 330, 340 are arranged such that the metallic nanoparticle lines 204 extend between the first contact pad 330 and the second contact pad 340. The contact pads 330, 340 have respective widths 334, 344 along the Y-direction. The contact pads 330, 340 are sufficiently wide such that they electrically contact all of the metallic nanoparticle lines 204. The metallic nanoparticle lines 202 are approximately parallel to the contact pads 330, 340 along their longitudinal directions and do not intersect the contact pads. The metallic nanoparticle lines 202 and the metallic nanoparticle lines 204 intersect. According to at least one aspect of the method 10 of FIG. 1, the contact pads 330, 340 are deposited (step 12 before the sintering (step 14). The contact pads 330, 340 can be formed from the metallic nanoparticle compositions that are used to form the metallic nanoparticle lines 202, 204.

For a conductor layer of a certain thickness disposed between two laterally-displaced contact pads, and wherein the conductor layer is a square, the electrical resistance between the contact pads is equivalent to the sheet resistance, as is the case for the example shown in FIG. 10. Using the experimental setup shown schematically in FIG. 10, multiple silver nanoparticle mesh samples 320 were prepared, with each sample 320 each having lines 202, 204 with a line width of 5 μm, and with the samples 320 respectively having lines 202, 204 spaced by pitches of 50 μm, 100 μm, 200 μm, 500 μm, and 1000 μm. The electrical resistance between the contact pads was measured for each silver nanoparticle mesh sample 320 and used to determine the sheet resistance of each sample 320. The determined sheet resistance values of the silver nanoparticle mesh samples 320 are shown below in Table 1. In some aspects, the sheet resistance of the various transparent conductive members disclosed herein is in a range of 1 to 100 Ω/square.

TABLE 1

| Pitch (μm) | Sheet Resistance (Ω/square) |
|---|---|
| 50 | 1.8 |
| 100 | 11 |
| 200 | 40 |
| 500 | 66 |
| 1000 | 165 |

EXAMPLES

Example 1: Silver Nanoparticle Paste Composition (85 wt %) in Triethylene Glycol, Including Dispersing Agent 2 wt %

Reagents:
AgNO$_3$—12.5 g
PVP (K30 grade)—100.1 g
Ethylene glycol—560 ml
Acetone—1520 ml
Ethanol 96%—300 ml
Triethylene glycol—1.326 ml
Dispersing agent, alkylammonium salt of a copolymer with acidic groups—235.2 μl 1) Synthesis Two synthesis reactions were done in parallel. For each synthesis reaction: AgNO$_3$ (12.5 g) was dissolved in 50 ml of Ethylene Glycol at room temperature. In a three-necked flask, PVP (100.2 g) was dissolved in 250 ml of Ethylene Glycol, under reflux, while heating at 140° C. AgNO$_3$ solution was poured in a quick movement (via funnel) into hot PVP dissolved in Ethylene Glycol. Mixtures were heated at 140° C. for 60 min under vigorous stirring. Finally, cooled in cold water bath until room temperature was reached.

2) Purification

Mixture from each synthesis was poured into a 2.5 liter beaker. 100 ml of Ethylene Glycol was added to the three-necked reaction flask, sonicated for 1 min under stirring and pooled with the previously mentioned fraction. 1440 ml of Acetone and 160 ml of Ethylene Glycol were mixed in a 2 liter beaker and poured into the beaker containing the Ag NPs suspension, under stirring first at 500 rpm, then 900 rpm. Another 40 ml of acetone was then added, then another 40 ml of acetone was added. There was a change in the color of the solution from dark green to brown. The contents of the beaker were poured equally into six 500 ml centrifuge bottles and were centrifuged for 15 min @ 4000×g. Clear orange supernatants were discarded. Silver pellets were re-dispersed in 40 ml of ethanol (per bottle) under sonication and shaking (10 min). The solution were poured into two bottles (120 ml per bottle), followed by centrifugation for 35 min @ 11000×g. The pellet were individually re-dispersed in premixtures of 30 ml EtOH and 58.8 μl dispersing agent (for each of 4 bottles of the double synthesis) under sonication and shaking (10 min).

3) Formulation

Approximately 120 ml of obtained dispersion were transferred into a syringe and filtered through 1.0 μm PA filter directly into round-bottom flask. 1.326 ml of triethylene glycol were added. Flask was placed on rotary evaporator at 43° C., 110 mbar for 40 min and then set to 35 mbar. Time taken to reach the set pressure was 30 min, and when reached, the condition was maintained for 5 min. Paste-like composition was transferred into a syringe and filtered through a 0.45 μm PVDF filter directly into 5 ml PE syringe (filled from top). Obtained dispersion is estimated to have a solid content concentration of 85 wt %±2 wt % (based on TGA measurement). Silver content is estimated to be in a range of 79 wt % to 83 wt % (based on ICP or AAS measurement). The concentration of the dispersing agent in the composition is estimated to be approximately 2 wt %.

Various aspects of the devices, systems, and methods described herein are set out in the following clauses.

Clause 1: A method of forming a transparent conductive member, the method comprising: extruding a metallic nanoparticle composition from a capillary tube onto a temporary substrate to form an extrudate; sintering the extrudate and the temporary substrate; dispensing a photocurable polymer onto the temporary substrate; laminating a second substrate to the photocurable polymer, wherein the photocurable polymer and the extrudate are interposed between the temporary substrate and the second substrate; curing the photocurable polymer to form a transparent polymer layer, wherein the extrudate is embedded in the transparent polymer layer; and separating the temporary substrate from the transparent polymer layer to form the transparent conductive member, wherein the transparent conductive member comprises the transparent polymer layer and the extrudate embedded in the transparent polymer layer.

Clause 2: The method of Clause 1, wherein the metallic nanoparticle composition comprises silver nanoparticles.

Clause 3: The method of any of Clauses 1-2, further comprising displacing the capillary tube relative to the temporary substrate along a predetermined trajectory to form metallic nanoparticle lines.

Clause 4: The method of any of Clauses 1-4, wherein the metallic nanoparticle lines have line widths in a range of 1 μm to 10 μm.

Clause 5: The method of any of Clauses 1-4, wherein the metallic nanoparticle lines are spaced by a pitch in a range of 50 μm to 1000 μm in at least one direction.

Clause 6: The method of any of Clauses 1-5, wherein the metallic nanoparticle lines are arranged in a mesh pattern.

Clause 7: The method of any of Clauses 1-6, wherein the transparent conductive member is comprises an optical transmission of at least 80% at 550 nm.

Clause 8: The method of any of Clauses 1-7, wherein the temporary substrate comprises a glass substrate.

Clause 9: The method of any of Clauses 1-8, wherein the second substrate comprises a plastic substrate.

Clause 10: The method of any of Clauses 1-9, further comprising attaching a permanent substrate to the transparent conductive member, wherein the permanent substrate is more elastic than the temporary substrate.

Clause 11: The method of any of Clauses 1-10, wherein the permanent substrate comprises a plastic substrate.

Clause 12: The method of any of Clauses 1-11, further comprising separating the second substrate from the transparent conductive member.

Clause 13: The method of any of Clauses 1-12, wherein the transparent conductive member is a free-standing transparent conductive film.

Clause 14: The method of any of Clauses 1-13, wherein the free-standing transparent film comprises a thickness in a range of 100 to 1000 μm.

Clause 15: The method of any of Clauses 1-14, wherein the transparent conductive member comprises a sheet resistance in a range of 1 to 100 Ω/square.

Clause 16: A free-standing transparent conductive film, comprising: a transparent polymer layer; and metallic nanoparticle lines embedded in the transparent polymer layer; wherein the metallic nanoparticle lines have line widths in a range of 1 μm to 10 μm; wherein the metallic nanoparticle lines are separated by a pitch in a range of 50 μm to 1000 μm in at least one direction; and wherein the free-standing transparent conductive film comprises an optical transmission of at least 80% at 550 nm.

Clause 17: The free-standing transparent conductive film of Clause 16, wherein the metallic nanoparticle lines comprises silver nanoparticles.

Clause 18: The free-standing transparent conductive film of any of Clauses 16-17, wherein the metallic nanoparticle lines are arranged in a mesh pattern.

Clause 19: The free-standing transparent conductive film of any of Clauses 16-18, wherein the free-standing transparent conductive film comprises a sheet resistance in a range of 1 to 100 Ω/square.

Clause 20: The free-standing transparent conductive film of any of Clauses 16-19, wherein the free-standing transparent conductive film is characterized by a thickness in a range of 100 to 1000 μm.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method of forming a transparent conductive member, the method comprising:
    extruding a metallic nanoparticle composition from a capillary tube onto a temporary substrate to form an extrudate;
    sintering the extrudate and the temporary substrate;
    dispensing a photocurable polymer directly onto a surface of the temporary substrate;
    laminating a second substrate to the photocurable polymer, wherein the photocurable polymer and the extrudate are interposed between the temporary substrate and the second substrate;
    curing the photocurable polymer to form a transparent polymer layer, wherein the extrudate is embedded in the transparent polymer layer;
    separating the temporary substrate from the transparent polymer layer to form the transparent conductive member, wherein the transparent conductive member comprises the transparent polymer layer and the extrudate embedded in the transparent polymer layer; and
    attaching a permanent substrate to the transparent conductive member, wherein the permanent substrate is more elastic than the temporary substrate.

2. The method of claim 1, wherein the metallic nanoparticle composition comprises silver nanoparticles.

3. The method of claim 1, wherein extruding the metallic nanoparticle composition from the capillary tube onto the temporary substrate to form the extrudate comprises displacing the capillary tube relative to the temporary substrate along a predetermined trajectory to form metallic nanoparticle lines.

4. The method of claim 3, wherein the metallic nanoparticle lines have line widths in a range of 1 µm to 10 µm.

5. The method of claim 3, wherein the metallic nanoparticle lines are spaced by a pitch in a range of 50 µm to 1000 µm in at least one direction.

6. The method of claim 3, wherein the metallic nanoparticle lines are arranged in a mesh pattern.

7. The method of claim 1, wherein the transparent conductive member comprises an optical transmission of at least 80% at 550 nm.

8. The method of claim 1, wherein the temporary substrate comprises a glass substrate.

9. The method of claim 1, wherein the second substrate comprises a plastic substrate.

10. The method of claim 1, wherein the permanent substrate comprises a plastic substrate.

11. The method of claim 1, further comprising:
    separating the second substrate from the transparent conductive member.

12. The method of claim 1, wherein the transparent conductive member is a free-standing transparent conductive film.

13. The method of claim 12, wherein the free-standing transparent conductive film comprises a thickness in a range of 100 to 1000 µm.

14. The method of claim 1, wherein the transparent conductive member comprises a sheet resistance in a range of 1 to 100 Ω/square.

\* \* \* \* \*